(12) United States Patent
Xiong et al.

(10) Patent No.: US 10,931,718 B2
(45) Date of Patent: *Feb. 23, 2021

(54) LOCAL BREAKOUT-BASED DATA INTERCEPTION METHOD AND DEVICE

(71) Applicant: Baicells Technologies Co. Ltd., Beijing (CN)

(72) Inventors: Zhiwei Xiong, Beijing (CN); Yanguang Wu, Beijing (CN)

(73) Assignee: Baicells Technologies Co. Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/085,720

(22) PCT Filed: Mar. 13, 2017

(86) PCT No.: PCT/CN2017/076391
§ 371 (c)(1),
(2) Date: Nov. 14, 2019

(87) PCT Pub. No.: WO2017/157255
PCT Pub. Date: Sep. 21, 2017

(65) Prior Publication Data
US 2020/0084245 A1 Mar. 12, 2020

(30) Foreign Application Priority Data
Mar. 17, 2016 (CN) .......................... 2016 1 0154558

(51) Int. Cl.
*H04L 29/06* (2006.01)
*H04W 12/00* (2009.01)
*H04L 12/66* (2006.01)

(52) U.S. Cl.
CPC .............. *H04L 63/30* (2013.01); *H04L 12/66* (2013.01); *H04W 12/007* (2019.01)

(58) Field of Classification Search
CPC ...... H04L 63/30; H04L 12/66; H04W 12/007; H04W 24/00; H04W 12/02
(Continued)

(56) References Cited

U.S. PATENT DOCUMENTS 8,797,905 B2 * 8/2014 Anthony, Jr. ..... H04W 12/0017
370/252
9,185,545 B2 * 11/2015 Yeoum .................. H04W 8/082
(Continued)

FOREIGN PATENT DOCUMENTS

CN 101605342 A 12/2009
CN 101646205 A 2/2010
(Continued)

OTHER PUBLICATIONS

Chinese Search Report for Chinese Application No. 201610154558. 4, dated May 24, 2018, 1 page.
(Continued)

*Primary Examiner* — Taghi T Arani
*Assistant Examiner* — Badri Narayanan
(74) *Attorney, Agent, or Firm* — TraskBritt (57) ABSTRACT

The present disclosure provides a method and a device for data interception based on Local Break Out (LBO). The method includes: receiving, by a local gateway, an interception request to intercept data of an interception target; intercepting, by the local gateway, LBO data of the interception target based on the interception request, to obtain intercepted data; and transmitting, by the local gateway, the intercepted data. The present disclosure can solve the solving the problem in the related art that an interception target cannot be intercepted in an LBO scenario.

6 Claims, 4 Drawing Sheets (58) Field of Classification Search
USPC .......................................................... 726/12
See application file for complete search history.

(56) References Cited

U.S. PATENT DOCUMENTS

| | | | | |
|---|---|---|---|---|
| 2008/0127335 | A1* | 5/2008 | Khan | H04L 63/1425 726/22 |
| 2010/0150138 | A1* | 6/2010 | Bjorsell | H04M 3/54 370/352 |
| 2010/0291897 | A1* | 11/2010 | Ghai | H04W 12/0017 455/410 |
| 2011/0141947 | A1* | 6/2011 | Li | H04L 65/103 370/259 |
| 2011/0145396 | A1* | 6/2011 | Kim | H04L 63/00 709/224 |
| 2012/0158955 | A1* | 6/2012 | Kim | H04L 63/30 709/224 |
| 2012/0167165 | A1* | 6/2012 | Kim | H04W 12/007 726/1 |
| 2013/0182841 | A1* | 7/2013 | Buckley | H04L 63/061 380/44 |
| 2013/0326631 | A1* | 12/2013 | Cartmell | H04L 63/0227 726/26 |
| 2015/0200972 | A1* | 7/2015 | Suryavanshi | H04L 63/306 726/1 |
| 2015/0381761 | A1* | 12/2015 | Suni | H04L 67/10 709/203 |
| 2017/0048913 | A1* | 2/2017 | Teyeb | H04W 76/16 |
| 2018/0007591 | A1* | 1/2018 | Xu | H04W 36/0055 |
| 2018/0241782 | A1* | 8/2018 | Senatore | H04L 65/1006 |
| 2019/0253880 | A1* | 8/2019 | Wu | H04W 12/007 |

FOREIGN PATENT DOCUMENTS

| | | | |
|---|---|---|---|
| CN | 102547861 B | 4/2016 | |
| CN | 105704140 A | 6/2016 | |
| CN | 105847241 A | 8/2016 | |
| CN | 105847242 A | 8/2016 | |
| EP | 2152032 A1 * | 2/2010 | ........ H04W 12/0013 |
| WO | 2013/139791 A1 | 9/2013 | |

OTHER PUBLICATIONS

Chinese 1st Office Action for Chinese Application No. 201610154558.4, dated Jun. 4, 2018, 13 pages.

International Search Report and Written Opinion received for PCT Patent Application No. PCT/CN2017/076391, dated May 31, 2017, 10 pages (3 pages of English Translation and 7 pages of Original Document).

* cited by examiner

LOCAL BREAKOUT-BASED DATA INTERCEPTION METHOD AND DEVICE

CROSS-REFERENCE TO RELATED APPLICATIONS

This application is a national phase entry under 35 U.S.C. § 371 of International Patent Application PCT/CN2017/076391, filed Mar. 13, 2017, designating the United States of America and published in Chinese as International Patent Publication WO 2017/157255 A1 on Sep. 9, 2017, which claims the benefit under Article 8 of the Patent Cooperation Treaty to Chinese Patent Application No. 201610154558.4, filed Mar. 17, 2016.

TECHNICAL FIELD

This disclosure relates to communication technology, and more particularly, to a method and a device for data interception based on Local BreakOut (LBO).

BACKGROUND

Figure 1:
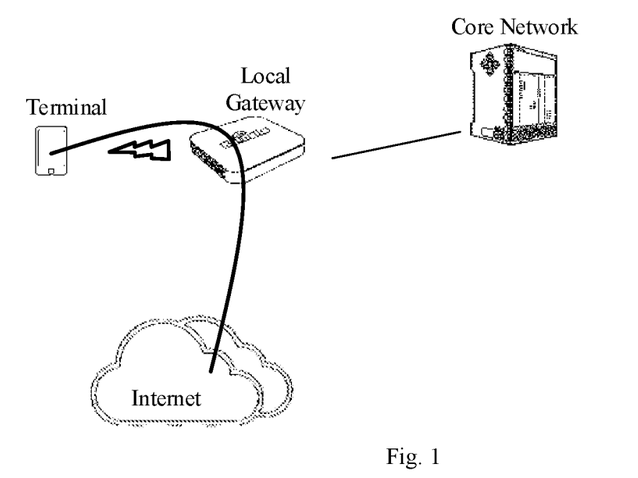
FIG. 1 is a schematic diagram showing a network deployment in an LBO scenario in the related art.

With the rapid development of smart terminals and video technologies, data in mobile networks increases explosively. In order to reduce the load on an Evolved Packet Core (EPC) of a mobile network, some local datagrams for low added-value services may be routed directly to a Public Data Network (PDN). This is referred to as Local Break Out (LBO). FIG. 1 is a schematic diagram showing a network deployment in an LBO service application scenario.

As shown in FIG. 1, after a User Equipment (UE) has entered a network, its IP datagrams transmitted from a base station are routed directly to the Internet. That is, the base station serves as the last hop for a mobile network device to route user traffic data locally to the Internet. The LBO has an increasingly wider range of application scenarios in mobile networks.

Figure 2:
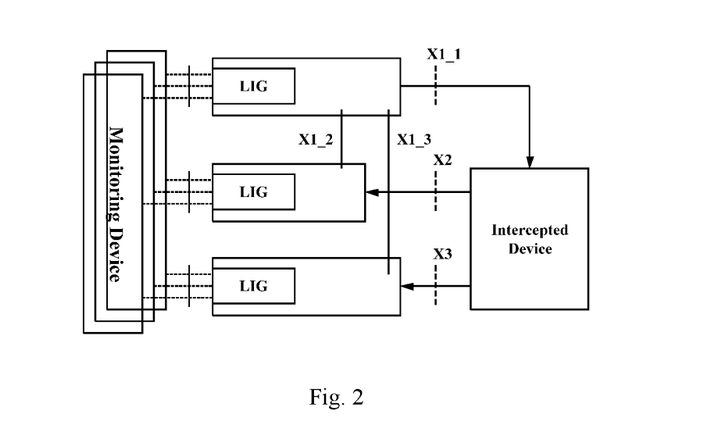
FIG. 2 is a schematic diagram showing an interception architecture in the related art.

Lawful Interception (LI) is an action allowed by law to intercept communications. Conventionally, the LI technique is provided according to standards defined by the $3^{rd}$ Generation Partnership Project (3GPP). FIG. 2 shows an LI architecture for Serving Gateway (S-GW)/Packet Data Network Gateway (PDN-GW)/evolved Packet Data Gateway (ePDG) in an Evolved Packet System (EPS) defined in 3GPP TS 33. 107.

In FIG. 2, the Law Enforcement Monitoring Facility (LEMF) is a monitoring device, the Mediation Function, ADMinistration Function (ADMF), Delivery Function2 and Delivery Function3 are all LI devices. For the purpose of description, they are referred to as Lawful Interception Gateway (LIG) collectively. In the figure, an X1_1 interface is provided for transmitting an interception instruction to an intercepted device, an X2 interface is provided for transmitting Interception Related Information (IRI) associated with signaling control in a mobile network, and an X3 interface is provided for transmitting intercepted Communication Contents (CCs).

In an interception request transmitted via the X1_1 interface, only the information associated with interception signaling control, i.e., the X2 IRI information, is required. Alternatively, both the X2 IRI and the X3 CC can be required and they can be associated with each other by a bearer, i.e., each bearer is associated with the CC transmitted over the bearer. Accordingly, each of the contents reported to the LIG via the X2 interface and via the X3 interface carries a feature value, such that the LIG can associate the reported X2 IRI with the reported X3 CC. This feature value is assigned by interception devices (S-GW, PDN-GW and ePDG) on a per bearer basis.

Currently, in a mobile network, intercepted targets are mainly network element devices in a core network. For example, in an EPS, the intercepted targets defined in 3GPP protocols include a Mobility Management Entity (MME), S-GW, PDN-GW, ePDG and Home Subscriber Server (HSS). Due to the path of data flow, the MME/HSS mainly provides IRI, such as a location of the intercepted target, some events (attachment, bearer activation and modification) are associated with the intercepted target and a Quality of Service (QoS) of a bearer. The corresponding user plane devices, such as S-GW, PDN-GW and ePDG can provide some intercepted user datagrams in addition to some IRI. However, in an LBO scenario, as traffic is offloaded at an eNodeB or a local gateway, without being delivered to the S-GW, PDN-GW or ePDG, it is currently impossible to intercept any events associated with the intercepted target in the LBO scenario.

There are currently no effective solutions to the above problems.

BRIEF SUMMARY

The embodiments of this disclosure provide a method and a device for data interception based on LBO, capable of solving the problem in the related art that an interception target cannot be intercepted in an LBO scenario.

In an aspect of the embodiments of this disclosure, a method for data interception based on LBO is provided. The method includes: receiving, by a local gateway, an interception request to intercept data of an interception target; intercepting, by the local gateway, LBO data of the interception target based on the interception request to obtain intercepted data; and transmitting, by the local gateway, the intercepted data.

In another aspect of the embodiments of this disclosure, a local gateway is provided. The local gateway includes: a receiving unit configured to receive an interception request to intercept data of an interception target; an intercepting unit configured to intercept LBO data of the interception target based on the interception request to obtain intercepted data; and a transmitting unit configured to transmit the intercepted data.

In an embodiment of this disclosure, a non-transitory computer-readable storage medium is provided. The non-transitory computer-readable storage medium stores computer instructions causing a computer to perform the above method for data interception based on LBO according to this disclosure.

In an embodiment of this disclosure, a computer program product is provided. The computer program product includes a computer program stored on a non-transitory computer-readable storage medium. The computer program includes program instructions which, when executed by a computer, cause the computer to perform the above method for data interception based on LBO according to this disclosure.

In an embodiment of this disclosure, an electronic device is provided. The electronic device includes at least one processor and a memory connected communicatively to the at least one processor. The memory stores instructions executable by the at least one processor for performing the above method for data interception based on LBO according to this disclosure.

With the embodiments of this disclosure, a local gateway receives an interception request to intercept data of an interception target, intercepts LBO data of the interception target based on the interception request to obtain intercepted data, and transmits the intercepted data. In this way, this disclosure achieves a technical effect of intercepting the interception target in an LBO scenario, thereby solving the problem in the related art that the interception target cannot be intercepted in the LBO scenario.

BRIEF DESCRIPTION OF THE DRAWINGS

The figures described herein are provided for further understanding of this disclosure, and constitute a part of this disclosure. The illustrative embodiments of this disclosure and the descriptions thereof are for explaining this disclosure, rather than unduly limiting this disclosure. In the figures.

DETAILED DESCRIPTION

In order to make those skilled in the art better understand the solution of this disclosure, the technical solutions in the embodiments of this disclosure are clearly and completely described in the following with reference to the accompanying drawings in the embodiments of this disclosure. It is apparent that the described embodiments are only part of the embodiments of this disclosure, but not all of them. All other embodiments obtained by those of ordinary skill in the art based on the embodiments of this disclosure without any creative effort shall fall within the scope of protection of this disclosure.

It should be noted that the terms "first," "second" and the like in the description and claims, as well as the above-mentioned drawings, of this disclosure are used to distinguish similar objects, but not necessarily used to describe a specific order or precedence order. It should be understood that data used in this way can be interchanged where appropriate so that the embodiments of this disclosure described herein can be implemented in a sequence other than those illustrated or described herein. The terms "including" and "having" and any variants thereof are intended to cover non-exclusive inclusions. For example, a process, method, system, product, or device that comprises a series of steps or units is not necessarily limited to those steps or units that are clearly listed, but may comprise other steps or units that are not clearly listed or are inherent to such processes, methods, products, or devices.

According to the embodiment of this disclosure, a method for data interception based on LBO is provided. It should be noted that the steps shown in the flowchart of the accompanying drawings can be performed in, for example, a computer system of a group of computer executable instructions. Besides, although a logical sequence is shown in the flowchart, in some cases, the steps shown or described can be performed in an order different from that described herein.

Figure 3:
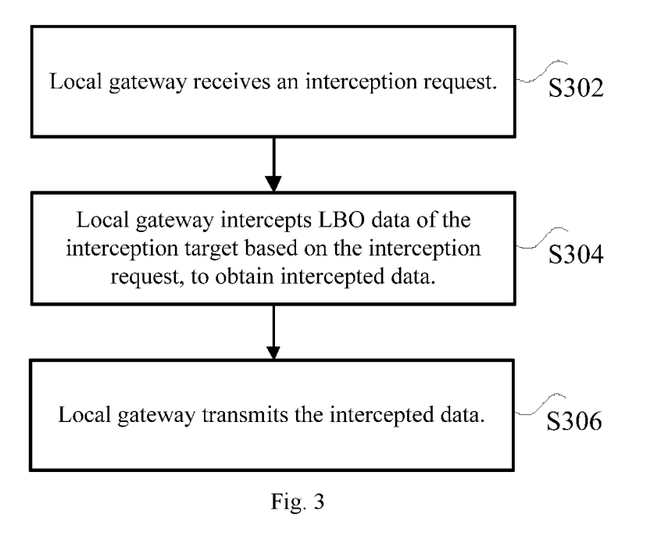
FIG. 3 is a flowchart illustrating a method for data interception based on LBO according to an embodiment of this disclosure.

FIG. 3 is a flowchart illustrating a method for data interception based on LBO according to an embodiment of this disclosure. As shown in FIG. 3, the method includes the following steps.

At step S302, a local gateway receives an interception request to intercept data of an interception target. The interception request may carry an identifier of the interception target, so as to request for interception of the interception target. The identifier of the interception target can be an identifier that uniquely identifies a UE, such as the UE's International Mobile Subscriber Identity (IMSI), Mobile Subscriber ISDN Number (MSISDN), International Mobile station Equipment Identity (IMEI), Network Access Identity (NAI) or IP address.

At step S304, the local gateway intercepts LBO data of the interception target based on the interception request to obtain intercepted data. In an LBO scenario, data traffic can bypass a core network and be offloaded from a local gateway directly to the Internet, without being delivered to S-GW, PDN-GW or ePDG. Hence, the LBO data of the interception target can be intercepted at the local gateway to obtain the intercepted data.

At step S306, the local gateway transmits the intercepted data. The local gateway can transmit the intercepted data to a default object for processing the intercepted data, e.g., an interception gateway, or to an address carried in the interception request.

In the LBO scenario, data traffic is directly offloaded from the local gateway, such that the offloaded traffic cannot be intercepted in a conventional way. With the above embodiment, by intercepting the locally offloaded data at the local gateway, the intercepted data can be obtained. In this way, the problem in the related art that the interception target cannot be intercepted in the LBO scenario can be solved, thereby achieving an effect of intercepting data in the LBO scenario.

Figure 4:
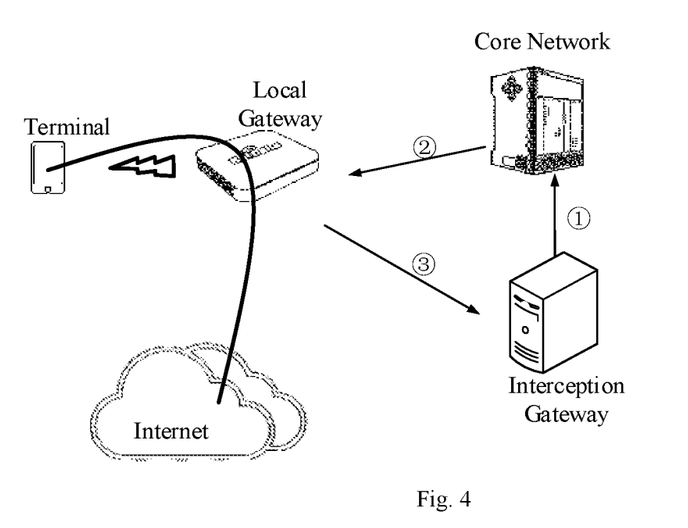
FIG. 4 is a schematic diagram showing a network deployment for data interception in an LBO scenario according to an embodiment of this disclosure.

As shown in FIG. 4, this embodiment is as follows.

An interception gateway transmits to a core network a target interception request to intercept data of Terminal A. The request may carry an identifier of Terminal A.

Upon receiving the request, the core network transmits an interception request to a local gateway. Optionally, the local gateway receives the interception request transmitted from the core network. That is, the interception request received by the local network is transmitted from the core network. Here, the interception request is generated by the core network based on the target interception request transmitted from the interception gateway. The interception request also carries the identifier of Terminal A. The identifier carried in the interception request transmitted from the core network may or may not be the same as that carried in the request transmitted from the interception gateway, as long as it can uniquely identify Terminal A. The interception request transmitted from the core network may carry IMSI, Globally Unique Temporary Identity (GUTI), or Bearer ID. In other words, eventually the identifier carried in the request transmitted from the interception gateway to the core network and the interception request transmitted from the core network will correspond to the same interception target. The local gateway intercepts data of Terminal A based on the identifier of the interception target.

The local gateway transmits the intercepted data to the interception gateway. FIG. 4 shows only one object to which the intercepted data is transmitted. However, the local gateway may transmit the intercepted data to other objects that receive and process the intercepted data as desired, e.g., to some address of a server.

Optionally, the local gateway intercepting the LBO data of the interception target based on the interception request may include: obtaining, by the local gateway, a first bearer used by the interception target and a feature value of the first bearer for associating the intercepted data with the bearer corresponding to the interception target; obtaining, by the local gateway, data transmitted over the first bearer; and generating, by the local gateway, the intercepted data based on the data obtained from the first bearer and the feature value of the first bearer.

The interception target may have one or more bearers each corresponding to a feature value (or correlation number). The first bearer may be one or more bearers. By intercepting the data transmitted over the first bearer, the local gateway copies uplink/downlink datagrams transmitted over the first bearer and adds a feature value to the datagrams copied in each bearer to indicate which data is copied from which bearer.

For example, the identifier of the interception target can be Bearer ID. The interception target can have three bearers: Bearer 1, Bearer 2 and Bearer 3, corresponding to feature values of 1, 2 and 3, respectively. The local gateway copies uplink/downlink datagrams of the interception target that has the data identifier of Bearer ID and is transmitted over the three bearers, and adds the feature values of the respective bearers to the copied datagrams, such that the generated intercepted data carries the feature values of the respective bearers. With the feature values, the bearer and the datagrams copied from the bearer can be associated with each other, so as to identify which intercepted data comes from which bearer.

Optionally, the interception request can carry a storage address and the local gateway transmitting the intercepted data can include: extracting, by the local gateway, the storage address carried in the interception request, the storage address being an address at which the intercepted data is to be stored; and encapsulating, by the local gateway, the feature value in the intercepted data in a predefined format and transmitting the encapsulated data to the storage address.

Optionally, when the intercepted data is generated, a feature value and additional information, e.g., timestamp information, required by the interception gateway for receiving X3 data contents can be added to the copied datagrams. The copied data, feature value and additional information required by the local gateway can be transmitted to the interception gateway or a storage address carried in the interception request in a format of X3 CCs. The storage address can be an address in a server.

Optionally, the local gateway obtaining the first bearer used by the interception target and the feature value of the first bearer can include: extracting, by the local gateway, an identifier of the first bearer and the feature value of the first bearer from the interception request and obtaining the first bearer used by the interception target based on the identifier of the first bearer; or extracting, by the local gateway, an identifier of the interception target from the interception request, retrieving the first bearer used by the interception target based on the identifier of the interception target, and generating the feature value for the retrieved first bearer. The first bearer and the feature value of the first bearer as obtained by the local gateway can be obtained by the local gateway directly from the interception request transmitted from the core network. If the interception request does not carry the feature value of the first bearer, the local gateway retrieves the first bearer of the interception target based on the identifier of the interception target carried in the interception request, and generates the feature value for the retrieved first bearer.

When the feature value of the first bearer is generated by the core network, the core network transmits instruction information to the interception gateway such as instruction to start, stop or continue the interception. When the feature value of the first bearer is generated by the local gateway, the above instruction information is transmitted from the local gateway to the interception gateway.

The two situations of this embodiment will be explained in the following with reference to FIGS. 5 and 6, respectively.

I. The Feature Value of the Bearer is Generated by the Core Network.

Optionally, when the interception request carries the identifier of the first bearer and the feature value of the first bearer, the feature value of the first bearer is generated by a core network device that transmits to an interception gateway notification information indicating that the interception of the interception target, as identified by the feature value, has already begun or ended.

Optionally, the method can further include: regenerating, by the core network device when the local gateway detects a modification to the first bearer (e.g., any variations in data type, data transmission target or the like), a feature value for the modified first bearer and transmitting to the interception gateway report information indicating that the interception of the interception target, as identified by the modified feature value, has continued.

Figure 5:
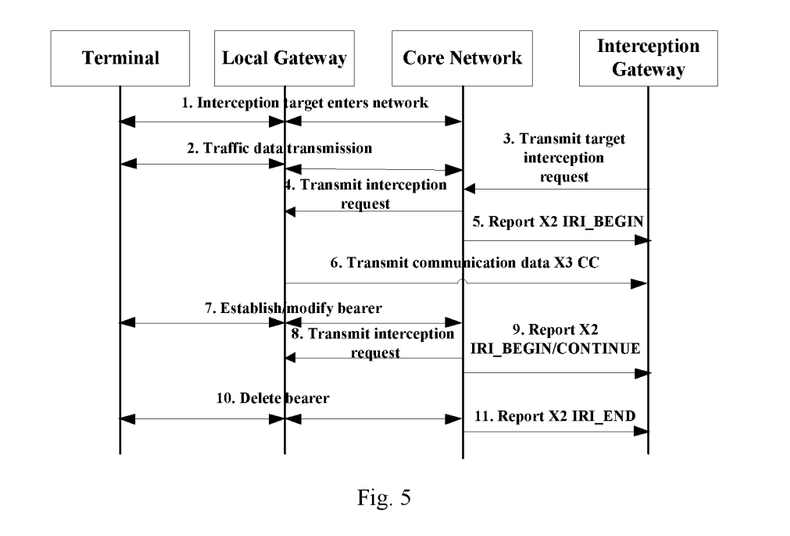
FIG. 5 is a schematic diagram showing interactions in a method for data interception based on LBO according to an optional embodiment of this disclosure.

As shown in FIG. 5, when the feature value is generated by the core network, an interception process in the method for data interception based on LBO is as follows.

1. The interception target enters a network, i.e., a terminal accesses the local gateway. Its traffic routing mode is a local routing mode. The local gateway accesses a base station, which in turn accesses the core network.

2. The terminal UE1 transmits data in an LBO scenario.

3. The core network receives a target interception request transmitted from the interception gateway. The request carries an identifier of the interception target, UE1. The types of the identifier have been described above and details thereof will be omitted here. In the following, the target identifier is assumed to be Bearer ID for example.

4. Upon receiving the target interception request, the core network knows that uplink/downlink datagrams of the interception target are required to be intercepted, i.e., interception information for CCs over the X3 interface is required. The core network assigns a feature value (Correlation Number) to each bearer used by each interception target, generates an interception request from the feature value of each bearer, the identifier of the interception target (Bearer ID) corresponding to each bearer and a destination address to which the local gateway is to transmit intercepted datagrams, and transmits it to the local gateway. That is, the interception request transmitted from the core network may include the identifier of the interception target, the feature value of each bearer and the address to receive the intercepted data. The address can be an address of the interception gateway.

5. The core network reports X2 IRI_BEGIN information to the interception gateway, informing the local gateway that the interception of CCs for the interception target (Bearer ID) as identified by the Correlation Number has begun.

6. The local gateway copies all uplink/downlink datagrams pertaining to the Bearer ID and adds the Correlation Number information informed by the core network in step 4 and additional information (e.g., timestamp) required for X3 CC, for transmission to the interception gateway whose address has been informed in step 4 in an X3 CC format.

7. An establishment of a new bearer or a modification of the original bearer is triggered depending on e.g., traffic requirements. That is, in step 4, the bearer obtained by the core network is changed, a new bearer is added or the original bearer is deleted or modified.

8. The core network assigns a new Correlation Number to the new bearer and transmits to the eNodeB an interception request message containing a new Bearer ID, the Correlation Number and an LIG address. Here, the new Bearer ID may be the same as the Bearer ID of the interception target in step 4, a new identifier of the interception target can be generated, or the identifier of the interception target carried in the request from the interception gateway can be used. The new Bearer ID and the original Bearer ID, either same or not, refer to the same interception target UE1.

9. Meanwhile, the core network reports the X2 IRI_BEGIN or IRI_CONTINUE information to the interception gateway, to inform the LIG that a new interception has begun the interception has continued. When a new bearer is added, the core network transmits information indicating that a new interception has begun, i.e., X2 IRI_BEGIN. When the original bearer is modified, the core network transmits information indicating that the interception has continued, i.e., IRI_CONTINUE.

10. The terminal traffic ends. The session is terminated by UE1. Alternatively, the bearer is deleted or the session is terminated by the local gateway, base station or core network.

11. The core network reports X2 IRI END event information carrying the Correlation Number to the interception gateway, informing termination of the interception.

II. The Feature Value of the Bearer is Generated by the Local Gateway.

Optionally, when the local gateway assigns the feature value to the retrieved first bearer, the local gateway transmits to an interception gateway notification information indicating that the interception of the interception target, as identified by the feature value, has already begun or ended.

Optionally, the method can further include: regenerating, by the local gateway upon detecting a modification to the first bearer, a feature value for the modified first bearer and transmitting to the interception gateway report information indicating that the interception of the interception target, as identified by the modified feature value, has continued.

Figure 6:
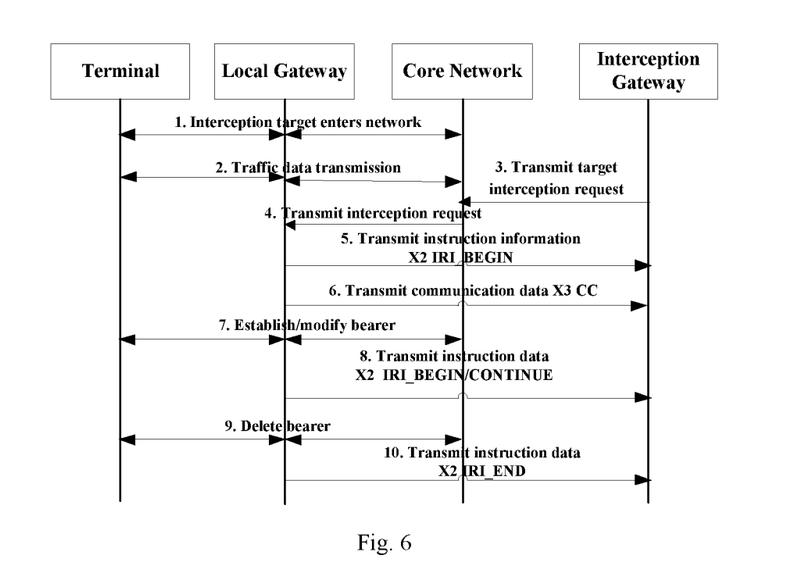
FIG. 6 is a schematic diagram showing interactions in a method for data interception based on LBO according to another optional embodiment of this disclosure.

As shown in FIG. 6, when the feature value is generated by the core network, an interception process in the method for data interception based on LBO is as follows.

1. The interception target enters a network, i.e., a terminal accesses the local gateway. Its traffic routing mode is a local routing mode. The local gateway accesses a base station, which in turn accesses the core network.

2. The terminal UE1 transmits data in an LBO scenario.

3. The core network receives a target interception request transmitted from the interception gateway. The request carries an identifier of the interception target, UE1. The types of the identifier have been described above and details thereof will be omitted here. In the following, the target identifier is assumed to be Bearer ID for example.

4. Upon receiving the target interception request, the core network knows that uplink/downlink datagrams of the interception target are required to be intercepted, i.e., interception information for CCs over the X3 interface is required. The core network generates an interception request and transmits it to the local gateway. The interception request carries an identifier of the interception target and an address to receive intercepted data, which can be an address of the interception gateway. Here, the identifier of the interception target can be any one or more of GUTI, IMSI, IMEI, MSISDN, UE IP or NAI, or a Bearer ID of a local bearer of the UE, i.e., an identifier of the UE that enables the local gateway to identify the interception target UE1 from all UEs.

5. The local gateway assigns a feature value to each bearer of the interception target and reports X2 IRI_BEGIN information to the interception gateway, informing the local gateway that the interception of CCs for the interception target (Bearer ID) as identified by the Correlation Number has begun.

6. The local gateway copies all uplink/downlink datagrams pertaining to the interception target and adds the feature value of the corresponding bearer and additional information (e.g., timestamp) required for X3 CC, for transmission to the interception gateway whose address has been informed in step 4 in an X3 CC format.

7. An establishment of a new bearer or a modification of the original bearer is triggered depending on e.g., traffic requirements. That is, in step 4, the bearer obtained by the core network is changed, a new bearer is added or the original bearer is deleted or modified.

8. The local gateway assigns a new feature value, which is generated by the local gateway, to the new bearer or the modified bearer. The local gateway reports the X2 IRI_BEGIN or IRI_CONTINUE information to the interception gateway, to inform the interception gateway that a new interception has begun the interception has continued. When a new bearer is added, the core network transmits information indicating that a new interception has begun, i.e., X2 IRI_BEGIN. When the original bearer is modified, the core network transmits information indicating that the interception has continued, i.e., IRI_CONTINUE.

9. The terminal traffic ends. The session is terminated by UE1. Alternatively, the bearer is deleted or the session is terminated by the local gateway, base station or core network.

10. The local gateway reports X2 IRI END event information carrying the Correlation Number to the interception gateway, informing termination of the interception.

The difference between the interception process when the feature value is generated by the core network and the interception process when the feature value is generated by the local gateway is as follows. When the feature value is generated by the core network, after the local gateway receives the interception request from the core network, only the X3 interface is used, i.e., the local gateway only transmits the intercepted CC data to the interception gateway. On the other hand, when the feature value is generated by the local gateway, after the local gateway receives the interception request from the core network, the X2 interface is used in addition to the X3 interface. That is, in addition to transmitting the intercepted CC data, the local gateway reports the related instruction information (X2 IRI), informing the interception gateway that the interception of data has begun, continued or ended.

For example, there is a video data transmission between Terminal A and Terminal B and data of Terminal A is to be intercepted. In this case, the IRI information may include: a geographical location of Terminal A (the location will be reported to the interception gateway when it moves from one base station to another), time when Terminal A begins to transmit chatting data, time when Terminal A stops transmitting chatting data, and a bandwidth used for transmission of the chatting data between Terminal A and Terminal B (i.e., the number of bearers used for transmission of the chatting data between Terminal A and Terminal B, each bearer having QoS properties including information of the bandwidth). The CC information refers to the specific chatting contents transmitted over the corresponding bearers between Terminal A and Terminal B.

With the above embodiment, the local gateway can intercept the LBO data in the LBO scenario and transmit the intercepted data to the intercepted gateway or a specified address. In this way, this disclosure can solve the problem in the related art that the interception target cannot be intercepted in the LBO scenario and achieve the technical effect of intercepting the interception target in an LBO scenario.

According to an embodiment of this disclosure, a local gateway is provided. The local gateway can perform the above method for data interception based on LBO and the above method for data interception based on LBO can be performed by the local gateway.

Figure 7:
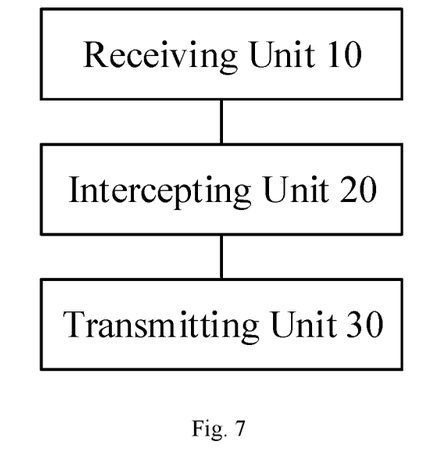
FIG. 7 is a schematic diagram showing a local gateway according to an embodiment of this disclosure.

As shown in FIG. 7, the local gateway includes a receiving unit 10, an intercepting unit 20 and a transmitting unit 30. The receiving unit 10 is configured to receive an interception request to intercept data of an interception target. The interception request may carry an identifier of the interception target, so as to request for interception of the interception target. The identifier of the interception target can be an identifier that uniquely identifies a UE, such as the UE's International Mobile Subscriber Identity (IMSI), Mobile Subscriber ISDN Number (MSISDN), International Mobile station Equipment Identity (IMEI), Network Access Identity (NAI) or IP address.

The intercepting unit 20 is configured to intercept LBO data of the interception target based on the interception request to obtain intercepted data. In an LBO scenario, data traffic can bypass a core network and be offloaded from a local gateway directly to the Internet, without being delivered to S-GW, PDN-GW or ePDG. Hence, the LBO data of the interception target can be intercepted at the local gateway to obtain the intercepted data.

The transmitting unit 30 is configured to transmit the intercepted data. The local gateway can transmit the intercepted data to a default object for processing the intercepted data, e.g., an interception gateway, or to an address carried in the interception request.

In the LBO scenario, data traffic is directly offloaded from the local gateway, such that the offloaded traffic cannot be intercepted in a conventional way. With the above embodiment, by intercepting the locally offloaded data at the local gateway, the intercepted data can be obtained. In this way, the problem in the related art that the interception target cannot be intercepted in the LBO scenario can be solved, thereby achieving an effect of intercepting data in the LBO scenario.

Optionally, the interception unit can include: a first obtaining module configured to obtain a first bearer used by the interception target and a feature value of the first bearer for associating the intercepted data with the bearer corresponding to the interception target; a second obtaining module configured to obtain data transmitted over the first bearer; and a generating module configured to generate the intercepted data based on the data obtained from the first bearer and the feature value of the first bearer.

The interception target may have one or more bearers each corresponding to a feature value (or correlation number). The first bearer may be one or more bearers. By intercepting the data transmitted over the first bearer, the local gateway copies uplink/downlink datagrams transmitted over the first bearer and adds a feature value to the datagrams copied in each bearer to indicate which data is copied from which bearer.

For example, the identifier of the interception target can be Bearer ID. The interception target can have three bearers: Bearer 1, Bearer 2 and Bearer 3, corresponding to feature values of 1, 2 and 3, respectively. The local gateway copies uplink/downlink datagrams of the interception target that has the data identifier of Bearer ID and is transmitted over the three bearers, and adds the feature values of the respective bearers to the copied datagrams, such that the generated intercepted data carries the feature values of the respective bearers. With the feature values, the bearer and the datagrams copied from the bearer can be associated with each other, so as to identify which intercepted data comes from which bearer.

Optionally, the interception request can carry a storage address. The transmitting unit can include: an extracting module configured to extract the storage address carried in the interception request, the storage address being an address at which the intercepted data is to be stored; and an encapsulating module configured to encapsulate the feature value in the intercepted data in a predefined format and transmit the encapsulated data to the storage address.

Optionally, when the intercepted data is generated, a feature value and additional information, e.g., timestamp information, required by the interception gateway for receiving X3 data contents can be added to the copied datagrams. The copied data, feature value and additional information required by the local gateway can be transmitted to the interception gateway or a storage address carried in the interception request in a format of X3 CCs. The storage address can be an address in a server.

Optionally, the first obtaining module includes: an extracting sub-module configured to extract an identifier of the first bearer and the feature value of the first bearer from the interception request and obtain the first bearer used by the interception target based on the identifier of the first bearer; or a generating sub-module configured to extract an identifier of the interception target from the interception request, retrieve the first bearer used by the interception target based on the identifier of the interception target, and generate the feature value for the retrieved first bearer.

The first bearer and the feature value of the first bearer as obtained by the local gateway can be obtained by the local gateway directly from the interception request transmitted from the core network. If the interception request does not carry the feature value of the first bearer, the local gateway retrieves the first bearer of the interception target based on the identifier of the interception target carried in the interception request, and generates the feature value for the retrieved first bearer.

When the feature value of the first bearer is generated by the core network, the core network transmits instruction information to the interception gateway such as instruction to start, stop or continue the interception. When the feature value of the first bearer is generated by the local gateway, the above instruction information is transmitted from the local gateway to the interception gateway.

The two situations of this embodiment will be explained in the following with reference to FIGS. 5 and 6, respectively.

I. The Feature Value of the Bearer is Generated by the Core Network.

Optionally, when the interception request carries the identifier of the first bearer and the feature value of the first bearer, the feature value of the first bearer is generated by a core network device that transmits to an interception gateway notification information indicating that the interception of the interception target, as identified by the feature value, has already begun or ended.

Optionally, when the local gateway detects a modification to the first bearer, the core network device regenerates a feature value for the modified first bearer and transmits to the interception gateway report information indicating that the interception of the interception target, as identified by the modified feature value, has continued.

As shown in FIG. 5, when the feature value is generated by the core network, an interception process in the method for data interception based on LBO is as follows.

1. The interception target enters a network, i.e., a terminal accesses the local gateway. Its traffic routing mode is a local routing mode. The local gateway accesses a base station, which in turn accesses the core network.

2. The terminal UE1 transmits data in an LBO scenario.

3. The core network receives a target interception request transmitted from the interception gateway. The request carries an identifier of the interception target, UE1. The types of the identifier have been described above and details thereof will be omitted here. In the following, the target identifier is assumed to be Bearer ID for example.

4. Upon receiving the target interception request, the core network knows that uplink/downlink datagrams of the interception target are required to be intercepted, i.e., interception information for CCs over the X3 interface is required. The core network assigns a feature value (Correlation Number) to each bearer used by each interception target, generates an interception request from the feature value of each bearer, the identifier of the interception target (Bearer ID) corresponding to each bearer and an address to which the local gateway is to transmit intercepted datagrams, and transmits it to the local gateway. That is, the interception request transmitted from the core network may include the identifier of the interception target, the feature value of each bearer and the address to receive the intercepted data. The address can be an address of the interception gateway.

5. The core network reports X2 IRI_BEGIN information to the interception gateway, informing the local gateway that the interception of CCs for the interception target (Bearer ID) as identified by the Correlation Number has begun.

6. The local gateway copies all uplink/downlink datagrams pertaining to the Bearer ID and adds the Correlation Number information informed by the core network in step 4 and additional information (e.g., timestamp) required for X3 CC, for transmission to the interception gateway whose address has been informed in step 4 in an X3 CC format.

7. An establishment of a new bearer or a modification of the original bearer is triggered depending on e.g., traffic requirements. That is, in step 4, the bearer obtained by the core network is changed, a new bearer is added or the original bearer is deleted or modified.

8. The core network assigns a new Correlation Number to the new bearer and transmits to the eNodeB an interception request message containing a new Bearer ID, the Correlation Number and an LIG address. Here, the new Bearer ID may be the same as the Bearer ID of the interception target in step 4, a new identifier of the interception target can be generated, or the identifier of the interception target carried in the request from the interception gateway can be used. The new Bearer ID and the original Bearer ID, either same or not, refer to the same interception target UE1.

9. Meanwhile, the core network reports the X2 IRI_BEGIN or IRI_CONTINUE information to the interception gateway, to inform the LIG that a new interception has begun the interception has continued. When a new bearer is added, the core network transmits information indicating that a new interception has begun, i.e., X2 IRI_BEGIN. When the original bearer is modified, the core network transmits information indicating that the interception has continued, i.e., IRI_CONTINUE.

10. The terminal traffic ends. The session is terminated by UE1. Alternatively, the bearer is deleted or the session is terminated by the local gateway, base station or core network.

11. The core network reports X2 IRI END event information carrying the Correlation Number to the interception gateway, informing termination of the interception.

II. The Feature Value of the Bearer is Generated by the Local Gateway.

Optionally, when the local gateway assigns the feature value to the retrieved first bearer, the local gateway transmits to an interception gateway notification information indicating that the interception of the interception target, as identified by the feature value, has already begun or ended.

Optionally, upon detecting a modification to the first bearer, the local gateway regenerates a feature value for the modified first bearer and transmits to the interception gateway report information indicating that the interception of the interception target, as identified by the modified feature value, has continued.

As shown in FIG. 6, when the feature value is generated by the core network, an interception process in the method for data interception based on LBO is as follows.

1. The interception target enters a network, i.e., a terminal accesses the local gateway. Its traffic routing mode is a local routing mode. The local gateway accesses a base station, which in turn accesses the core network.

2. The terminal UE1 transmits data in an LBO scenario.

3. The core network receives a target interception request transmitted from the interception gateway. The request carries an identifier of the interception target, UE1. The types of the identifier have been described above and details thereof will be omitted here. In the following, the target identifier is assumed to be Bearer ID for example.

4. Upon receiving the target interception request, the core network knows that uplink/downlink datagrams of the interception target are required to be intercepted, i.e., interception information for CCs over the X3 interface is required. The core network generates an interception request and transmits it to the local gateway. The interception request carries an identifier of the interception target and an address to receive intercepted data, which can be an address of the interception gateway. Here, the identifier of the interception target can be any one or more of GUTI, IMSI, IMEI, MSISDN, UE IP or NAI, or a Bearer ID of a local bearer of the UE, i.e., an identifier of the UE that enables the local gateway to identify the interception target UE1 from all UEs.

5. The local gateway assigns a feature value to each bearer of the interception target and reports X2 IRI_BEGIN information to the interception gateway, informing the local gateway that the interception of CCs for the interception target (Bearer ID) as identified by the Correlation Number has begun.

6. The local gateway copies all uplink/downlink datagrams pertaining to the interception target and adds the feature value of the corresponding bearer and additional information (e.g., timestamp) required for X3 CC, for transmission to the interception gateway whose address has been informed in step 4 in an X3 CC format.

7. An establishment of a new bearer or a modification of the original bearer is triggered depending on e.g., traffic requirements. That is, in step 4, the bearer obtained by the core network is changed, a new bearer is added or the original bearer is deleted or modified.

8. The local gateway assigns a new feature value, which is generated by the local gateway, to the new bearer or the modified bearer. The local gateway reports the X2 IRI_BEGIN or IRI_CONTINUE information to the interception gateway, to inform the interception gateway that a new interception has begun or the interception has continued. When a new bearer is added, the core network transmits information indicating that a new interception has begun, i.e., X2 IRI_BEGIN. When the original bearer is modified, the core network transmits information indicating that the interception has continued, i.e., IRI_CONTINUE.

9. The terminal traffic ends. The session is terminated by UE1. Alternatively, the bearer is deleted or the session is terminated by the local gateway, base station or core network.

10. The local gateway reports X2 IRI END event information carrying the Correlation Number to the interception gateway, informing termination of the interception.

The difference between the interception process when the feature value is generated by the core network and the interception process when the feature value is generated by the local gateway is as follows. When the feature value is generated by the core network, after the local gateway receives the interception request from the core network, only the X3 interface is used, i.e., the local gateway only transmits the intercepted CC data to the interception gateway. On the other hand, when the feature value is generated by the local gateway, after the local gateway receives the interception request from the core network, the X2 interface is used in addition to the X3 interface. That is, in addition to transmitting the intercepted CC data, the local gateway reports the related instruction information (X2 IRI), informing the interception gateway that the interception of data has begun, continued or ended.

For example, there is a video data transmission between Terminal A and Terminal B and data of Terminal A is to be intercepted. In this case, the IRI information may include: a geographical location of Terminal A (the location will be reported to the interception gateway when it moves from one base station to another), time when Terminal A begins to transmit chatting data, time when Terminal A stops transmitting chatting data, and a bandwidth used for transmission of the chatting data between Terminal A and Terminal B (i.e., the number of bearers used for transmission of the chatting data between Terminal A and Terminal B, each bearer having QoS properties including information of the bandwidth). The CC information refers to the specific chatting contents transmitted over the corresponding bearers between Terminal A and Terminal B.

According to an embodiment, a non-transitory computer-readable storage medium is also provided. The non-transitory computer-readable storage medium stores computer instructions causing a computer to execute the method according to any of the above method embodiments of this disclosure.

According to an embodiment, a computer program product is also provided. The computer program product includes a computer program stored on a non-transitory computer-readable storage medium. The computer program includes program instructions which, when executed by a computer, cause the computer to execute the method according to any of the above method embodiments of this disclosure.

Figure 8:
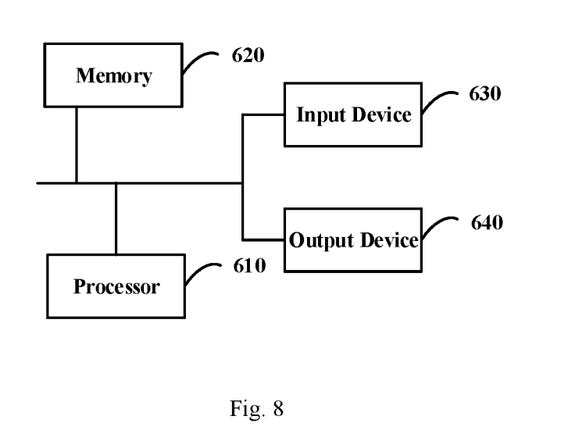

FIG. 8 is a schematic diagram showing a hardware structure of an electronic device that performs the method for data interception based on LBO according to an embodiment. As shown in FIG. 8, the electronic device includes one or more processors 610 and a memory 620. FIG. 8 illustrates one processor 610 as an example.

The electronic device can further include an input device 630 and an output device 640.

The processor 610, the memory 620, the input device 630 and the output device 640 can be connected via a bus or by other means. FIG. 8 illustrates a bus connection as an example.

As a non-transitory computer-readable storage medium, the memory 620 can be configured to store a non-transitory software program, a non-transitory computer executable program and modules, for example, program instructions/modules (for example, the receiving unit 10, intercepting unit 20 and transmitting unit 30 as shown in FIG. 7) corresponding to the method for data interception based on LBO in the embodiment of this disclosure. The processor 610 executes various functional applications and data processing of a server through running of the non-transitory software program, instruction and module stored in the memory 620. In this way, the method for data interception based on LBO in the above embodiment can be executed.

The memory 620 can include a program memory area and a data memory area. The program memory area can store an operating system and an application program required by at least one function. The data memory area can store data that are created in accordance with application of the device for data interception based on LBO. Moreover, the memory 620 can include a high-speed random access memory, and can further include a non-transitory memory, such as at least one disk memory, a flash memory or other non-transitory solid-state memories. In some embodiments, the memory 620 can include memories that are remotely disposed relative to the processor 610. These remote memories can be connected to the device for data interception based on LBO through networks that include but not limited to Internet, Intranet, local area network, mobile radio communications and a combination thereof.

The input device 630 can receive input digital or character information and generate key signal inputs relevant to user settings and functional control of the device for data interception based on LBO. The output device 640 can include a display device such as a display screen.

The one or more modules are stored in the memory 620. The modules, when executed by one or more processors 610, perform the method for data interception based on LBO in any of the above method embodiments.

The above product can execute the method provided by the embodiment of this disclosure and have corresponding functional modules and beneficial effects for executing the method. For the technical details not described in the present embodiment, reference can be made to the method provided by the embodiment of this disclosure.

The electronic device provided by the embodiment of this disclosure can be embodied in various forms, including but not limited to the following.

(1) Mobile communication equipment: those having the feature of a mobile communication function and the main object of providing voice and data communication, and including a smart phone (e.g., iPhone), a multimedia mobile phone, a functional mobile phone, a low-end mobile phone, etc.

(2) Ultra-mobile personal computer equipment: those belonging to personal computers, having computing and processing functions, generally having a mobile Internet access feature and including PDAs, MIDs, UMPCs, etc., for example, iPads.

(3) Portable recreation equipment: those being capable of displaying and broadcasting multimedia contents and including audio and video players (e.g., iPods), a hand-held game player, an e-book, intelligent toys and portable vehicle-mounted navigation equipment.

(4) Servers: those providing computing service and including a processor, a hard disk, an internal memory, a system bus, etc., having a similar architecture to a universal computer and placing higher demands on the processing capability, the stability, the reliability, the security, the expandability, the manageability, etc., due to the need for providing high-reliability services.

(5) Other electronic devices with data interaction functions.

The serial numbers of the embodiments of this disclosure are merely for description, and do not represent the advantages and disadvantages of the embodiments.

In the above-mentioned embodiments of this disclosure, the descriptions of the embodiments have their respective emphases. For the parts that are not detailed in a certain embodiment, reference can be made to the related descriptions of other embodiments.

It should be understood that in the embodiments provided by this disclosure, the disclosed technical contents can be achieved by other means. The device embodiments described above are merely schematic. For example, the partitioning of the units can be a logical functional partitioning. There may be other partitioning modes during actual implementation. For example, multiple units or components can be combined or integrated into another system, or some features can be ignored or not executed. In addition, mutual coupling or direct coupling or communication connection that is shown or discussed can be indirect coupling or communication connection through some interfaces, units or modules, and can be in electrical or other forms.

The units described as separate components may or may not be physically separated, and the components for unit display may or may not be physical units, that is, may be located in one place or distributed on a plurality of units. Part or all of the units can be selected according to actual needs to achieve the object of the solutions of the embodiments.

In addition, all functional units in the embodiments of this disclosure can be integrated into one processing unit. Or, each unit exists physically independently. Or, two or more units can be integrated into one unit. The above integrated units can be embodied in the form of hardware or a software functional unit.

The integrated units, if embodied in the form of the software functional unit and sold or used as a standalone product, can be stored in a computer-readable storage medium. Based on such understanding, the technical solution of this disclosure in essence, or a part that contributes to the related art, or all or part of the technical solution, can be embodied in the form of a software product. The computer software product is stored in a storage medium and includes a plurality of instructions for a computer device (which can be a personal computer, a server, a network device or the like) to perform all or part of the steps of the method described in the embodiments of this disclosure. The foregoing storage medium includes: a USB flash disk, a Read-Only Memory (ROM), a Random Access Memory (RAM), a removable hard disk, a magnetic disk, an optical disk, or other various media that can store program codes.

The above description merely describes preferable implementations of this disclosure, and it should be noted that those skilled in the art can also make various improvements and modifications without departing from the principle of this disclosure. These improvements and modifications should be considered to be within the scope of protection of this disclosure.

What is claimed is:

1. A method for data interception based on Local Break Out (LBO), comprising:
    receiving, by a local gateway, an interception request to intercept data of an interception target;
    intercepting, by the local gateway, LBO data of the interception target based on the interception request, to obtain the intercepted LBO data; and
    transmitting, by the local gateway, the intercepted LBO data,
    wherein the local gateway intercepting the LBO data of the interception target based on the interception request comprises:
    obtaining, by the local gateway, a first bearer used by the interception target and a feature value of the first bearer for associating the intercepted LBO data with the bearer corresponding to the interception target;
    obtaining, by the local gateway, data transmitted over the first bearer; and
    generating, by the local gateway, the intercepted LBO data based on the data obtained from the first bearer and the feature value of the first bearer; and
    wherein the local gateway obtaining the first bearer used by the interception target and the feature value of the first bearer comprises:
    extracting, by the local gateway, an identifier of the first bearer and the feature value of the first bearer from the interception request and
    obtaining the first bearer used by the interception target based on the identifier of the first bearer.

2. The method of claim 1, wherein the interception request carries a storage address and the local gateway transmitting the intercepted LBO data comprises:
    extracting, by the local gateway, the storage address carried in the interception request, the storage address being an address at which the intercepted LBO data is to be stored; and
    encapsulating, by the local gateway, the feature value in the intercepted LBO data in a predefined format and transmitting the encapsulated data to the storage address.

3. The method of claim 1, wherein when the interception request carries the identifier of the first bearer and the feature value of the first bearer, the feature value of the first bearer is generated by a core network device which transmits to an interception gateway notification information indicating that the interception of the interception target, as identified by the feature value, has already begun or ended.

4. The method of claim 3, further comprising:
regenerating, by the core network device when the local gateway detects a modification to the first bearer, a feature value for the modified first bearer and transmitting to the interception gateway report information indicating that the interception of the interception target, as identified by the modified feature value, has continued.

5. The method of claim 1, wherein the local gateway receiving the interception request comprises:
receiving, by the local gateway, the interception request transmitted from a core network, the interception request being generated by the core network based on a target interception request transmitted from an interception gateway.

6. A local gateway, comprising:
at least one processor; and
a memory communicatively connected to the at least one processor,
wherein the memory stores instructions executable by the at least one processor, and the instructions comprises:
a receiving unit configured to receive an interception request to intercept data of an interception target;
an intercepting unit configured to intercept Local Break Out (LBO) data of the interception target based on the interception request, to obtain intercepted LBO data; and
a transmitting unit configured to transmit the intercepted LBO data,
wherein the local gateway intercepting the LBO data of the interception target based on the interception request comprises:
obtaining, by the local gateway, a first bearer used by the interception target and a feature value of the first bearer for associating the intercepted LBO data with the bearer corresponding to the interception target;
obtaining, by the local gateway, data transmitted over the first bearer; and
generating, by the local gateway, the intercepted LBO data based on the data obtained from the first bearer and the feature value of the first bearer; and
wherein the local gateway obtaining the first bearer used by the interception target and the feature value of the first bearer comprises:
extracting, by the local gateway, an identifier of the first bearer and the feature value of the first bearer from the interception request and
obtaining the first bearer used by the interception target based on the identifier of the first bearer.

* * * * *

UNITED STATES PATENT AND TRADEMARK OFFICE
CERTIFICATE OF CORRECTION

| | |
|---|---|
| PATENT NO. | : 10,931,718 B2 |
| APPLICATION NO. | : 16/085720 |
| DATED | : February 23, 2021 |
| INVENTOR(S) | : Zhiwei Xiong and Yanguang Wu |

Page 1 of 1

It is certified that error appears in the above-identified patent and that said Letters Patent is hereby corrected as shown below:

On the Title Page

In Item (73),  Line 1,  change "BAICELLS TECHNOLOGIES CO. LTD." to
--BAICELLS TECHNOLOGIES CO. LTD., Beijing (CN)--

In the Specification

| | | |
|---|---|---|
| Column 7, | Line 42, | change "IRI END" to --IRI_END-- |
| Column 8, | Line 52, | change "IRI END" to --IRI_END-- |
| Column 12, | Line 22, | change "IRI END" to --IRI_END-- |
| Column 13, | Line 31, | change "IRI END" to --IRI_END-- |

Signed and Sealed this
Twentieth Day of April, 2021

Drew Hirshfeld
*Performing the Functions and Duties of the
Under Secretary of Commerce for Intellectual Property and
Director of the United States Patent and Trademark Office*